(12) United States Patent
Tapia

(10) Patent No.: US 12,122,415 B2
(45) Date of Patent: Oct. 22, 2024

(54) MULTIPLE FREQUENCY FUSION FOR ENHANCED POINT CLOUD FORMATION

(71) Applicant: GM Cruise Holdings LLC, San Francisco, CA (US)

(72) Inventor: Daniel Flores Tapia, Fairfield, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 387 days.

(21) Appl. No.: 17/836,065

(22) Filed: Jun. 9, 2022

(65) Prior Publication Data

US 2023/0399009 A1    Dec. 14, 2023

(51) Int. Cl.
*B60W 60/00* (2020.01)
*G01S 13/18* (2006.01)

(52) U.S. Cl.
CPC ........... *B60W 60/001* (2020.02); *G01S 13/18* (2013.01); *B60W 2420/408* (2024.01)

(58) Field of Classification Search
None
See application file for complete search history.

(56) References Cited

U.S. PATENT DOCUMENTS

| | | | | |
|---|---|---|---|---|
| 6,026,129 A | * | 2/2000 | Ohta | H04B 1/0039 455/188.1 |
| 11,536,801 B1 | * | 12/2022 | Li | B60W 60/001 |
| 12,061,249 B1 | * | 8/2024 | Loui | G01S 7/038 |
| 2019/0004533 A1 | * | 1/2019 | Huang | G01S 17/86 |
| 2019/0318463 A1 | * | 10/2019 | Zhang | G06T 5/73 |
| 2021/0199808 A1 | * | 7/2021 | Shin | G01S 17/04 |
| 2021/0314201 A1 | * | 10/2021 | Nikitin | H04L 25/08 |
| 2022/0146667 A1 | * | 5/2022 | Banin | G01S 13/58 |

* cited by examiner

Primary Examiner — Vladimir Magloire
Assistant Examiner — David C. Schultz
(74) Attorney, Agent, or Firm — Michael DiCato

(57) ABSTRACT

Methods and apparatus disclosed within provide a solution to problems associated with the use of either high frequency or low frequency radar signals. Methods of the present disclosure may transmit high frequency radar signals, transmit low frequency radar signals, receive reflected radar signals, and process the received radar signals using parameters respectively suited for processing high frequency and low frequency radar signals. Evaluations may be performed that allow an apparatus to adapt for limitations associated with the processing of high frequency radar data, the processing of low frequency radar data, or both. Different correlation functions may be performed that allow the apparatus to identify objects and to identify object velocities using different sets of program code instructions. These different evaluations and correlations may result in the generation of a set of "point-cloud" information that may be used by other processes of a sensing apparatus.

20 Claims, 5 Drawing Sheets

MULTIPLE FREQUENCY FUSION FOR ENHANCED POINT CLOUD FORMATION

BACKGROUND

1. Technical Field

The present disclosure is generally related to evaluating radio detection and ranging (radar). More specifically, the present disclosure is directed to leveraging the benefits of both higher frequency radar and lower frequency radar signals.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
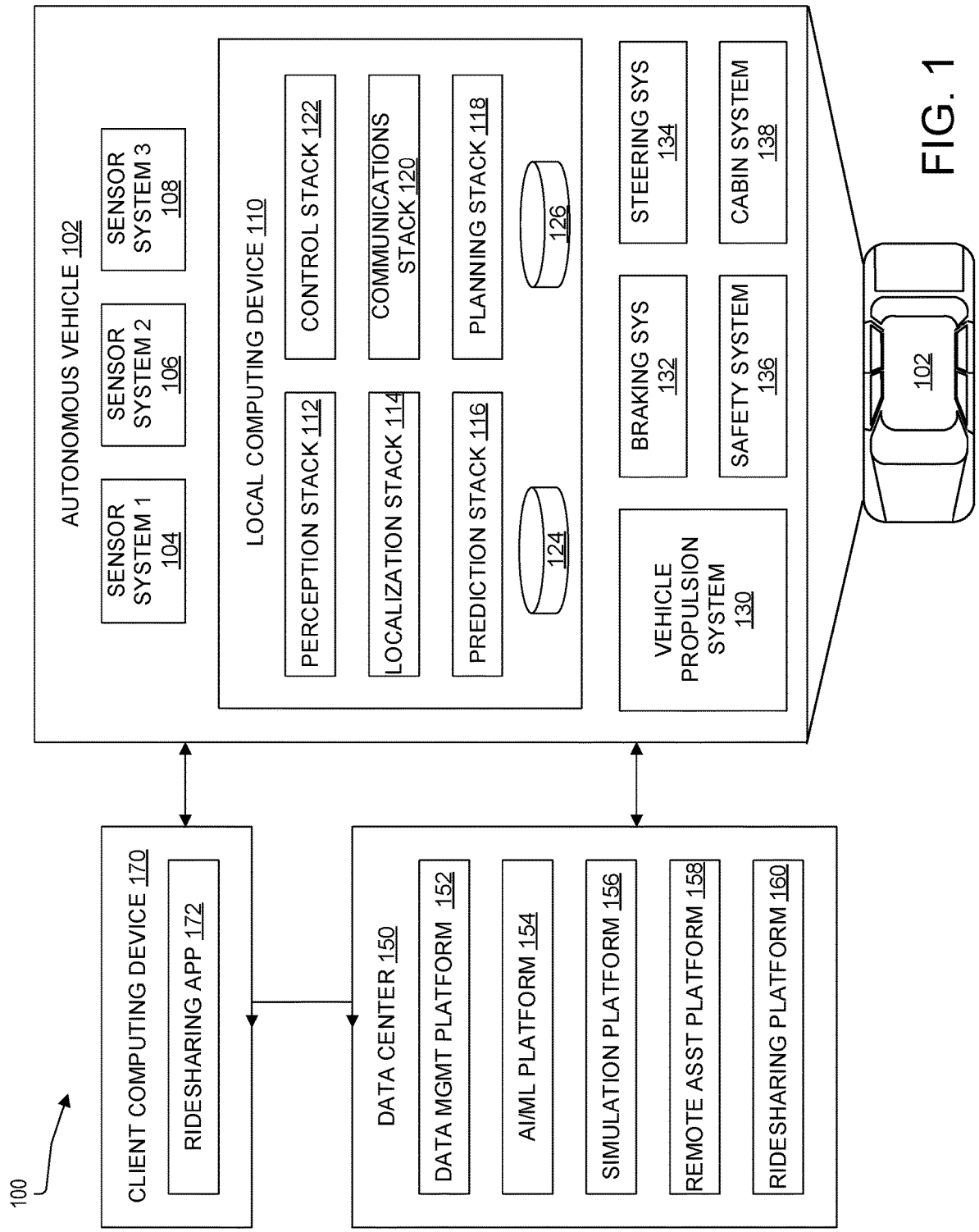
FIG. 1 illustrates an example of a system for managing one or more Autonomous Vehicles (AVs) in accordance with some aspects of the present technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available using different radar signal frequencies to improve overall operation of a sensing apparatus. The present disclosure contemplates that in some instances, this gathered data may include personal information. The present disclosure contemplates that the entities involved with such personal information respect and value privacy policies and practices.

Methods and apparatus disclosed within provide a solution to problems associated with the use of either high frequency or low frequency radar signals. Methods of the present disclosure may transmit high frequency radar signals, transmit low frequency radar signals, receive reflected radar signals, and process the received radar signals using parameters respectively suited for processing high frequency and low frequency radar signals. Evaluations may be performed that allow an apparatus to adapt for limitations associated with the processing of high frequency radar data, the processing of low frequency radar data, or both. Different correlation functions may be performed that allow the apparatus to identify objects and to identify object velocities using different sets of program code instructions. These different evaluations and correlations may result in the generation of a set of "point-cloud" information that may be used by other processes of a sensing apparatus.

Radar sensors, such as those used in autonomous vehicle (AV) applications commonly support different operating modes that are tailored to specific operating environments. Generally, the use of higher frequency radar signals allow radar apparatuses to generate higher resolution mappings of a space as compared to mappings generated when lower frequency radar signals are used. Greater resolution may allow for higher frequency radar apparatus to discriminate between two different objects that are close to each other in instances when lower frequency radar apparatus may not. Radar apparatus that use higher frequency radar signals may also be more susceptible to false detections as compared to a same apparatus that uses lower frequency radar signals in certain instances.

In certain conditions, the use of high frequency radar signals may be comparable to using low frequency radar signals. For example, in nominal conditions like clear weather, an apparatus using higher frequency radar signals may identify object characteristics and distances that correspond to object conditions and distances detected by a radar apparatus that uses lower frequency radar signals. Because of this detection capabilities (e.g. object detection and object ranging capabilities) associated with high frequency radar signals may be comparable to detection capabilities associated with low frequency radar signals in many instances. Alternatively, detection capabilities associated with high frequency radar signals may be significantly different from detection capabilities associated with low frequency radar signals. This is because different weather conditions or materials may block, absorb, or degrade high frequency radar signals, where the same weather conditions or materials may not block, absorb, or degrade low frequency radar signals to the same extent as the high frequency radar signals. For example, accumulated snow, falling snow, heavy foliage, or heavy rain may block, absorb, and/or degrade high frequency radar signals to a greater extent than lower frequency radar signals. This means that depending on circumstances or environments, either higher frequency or lower frequency radars signals may be used to generate data that are more useful. By using both higher frequency and lower frequency signals, methods and apparatus of the present disclosure may generate data sets of higher quality as compared to relying upon radar signals of a same frequency.

Because of the factors reviewed above, an effective range of high frequency radar signals may be different from an effective range of low frequency radar signals. Reasons for these different effective ranges may not be apparent to processor of a radar apparatus. When differences in ranges associated with high frequency radar signals and ranges associated with low frequency radar signals is observed, the processor may make evaluations based on these differences despite the processor not being aware of an apparent cause for these differences.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
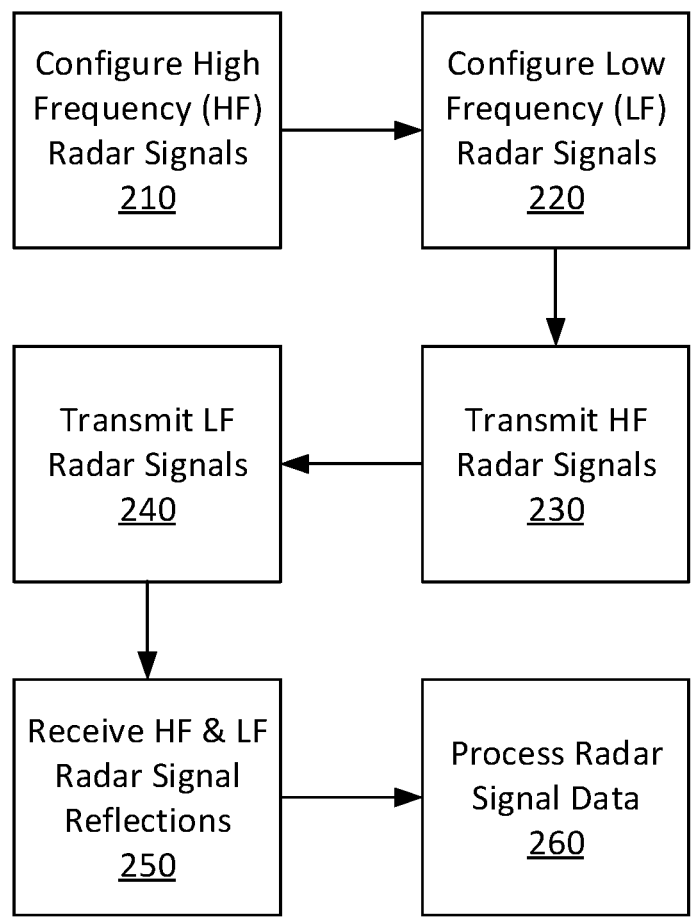
FIG. 2 illustrates a series of steps that may be performed at a sensing apparatus of an automated vehicle (AV).

FIG. 2 illustrates a series of steps that may be performed at a sensing apparatus of an automated vehicle (AV). The steps of FIG. 2 may be performed by a processor executing instructions out of a memory at the sensing apparatus of the AV. A radar apparatus may be configured to transmit a first set of radar signals in step 210 of FIG. 2 and that radar apparatus may also be configured to transmit a second set of radar signals in step 220 of FIG. 2. This first set of radar signals may have a frequency that is higher than a frequency of the second set of radar signals. Because of this, the radar signals configured for transmission in step 210 may be considered high frequency radar signals and the radar signals configured for transmission in step 220 may be considered low frequency radar signals. A high frequency radar signal may have a frequency of 77 gigahertz (GHz) and a low frequency radar signal may have a frequency of 24 GHz or 60 GHz. The configurations performed in steps 210 and 220 may allow the radar apparatus to transmit both high and low frequency radar signals with specific characteristics. These different characteristics may include different magnitudes of transmitted radar energy, different numbers of transmission periods or chirps used for particular frequencies, and/or time intervals between when different signals are transmitted.

A radar apparatus that transmits and receives radar signals may use a same antenna to transmit both the high frequency and the low frequency radar signals. This radar apparatus may include multiple antennas that may both transmit radar signals and that receive reflected radar signals after the transmitted signals bounce off of objects near the radar apparatus.

Step 230 may include transmitting a set of high frequency radar signals and step 240 of FIG. 2 may include transmitting a set of low frequency radar signals. Next in step 250, sets of reflected high frequency radar signals and low frequency radar signals may be received. These received radar signals may then be processed in step 260 of FIG. 2. Different sets of transmitted radar signals may include encoded data that may be used to identify when a particular set of received reflected signals was originally transmitted (a transmission time identifier) or may include an encoded radar apparatus identifier that is unique to a radar apparatus. Based on this, information encoded in a radar signal may be used to identify time of flight of a radar signal, a range or distance to an object. Alternatively, or additionally this information may be used to identify that certain detections may be false detections (based on a time of flight being greater than a threshold amount of time) or may be used to identify that radar data transmitted from another apparatus should be ignored.

Figure 3:
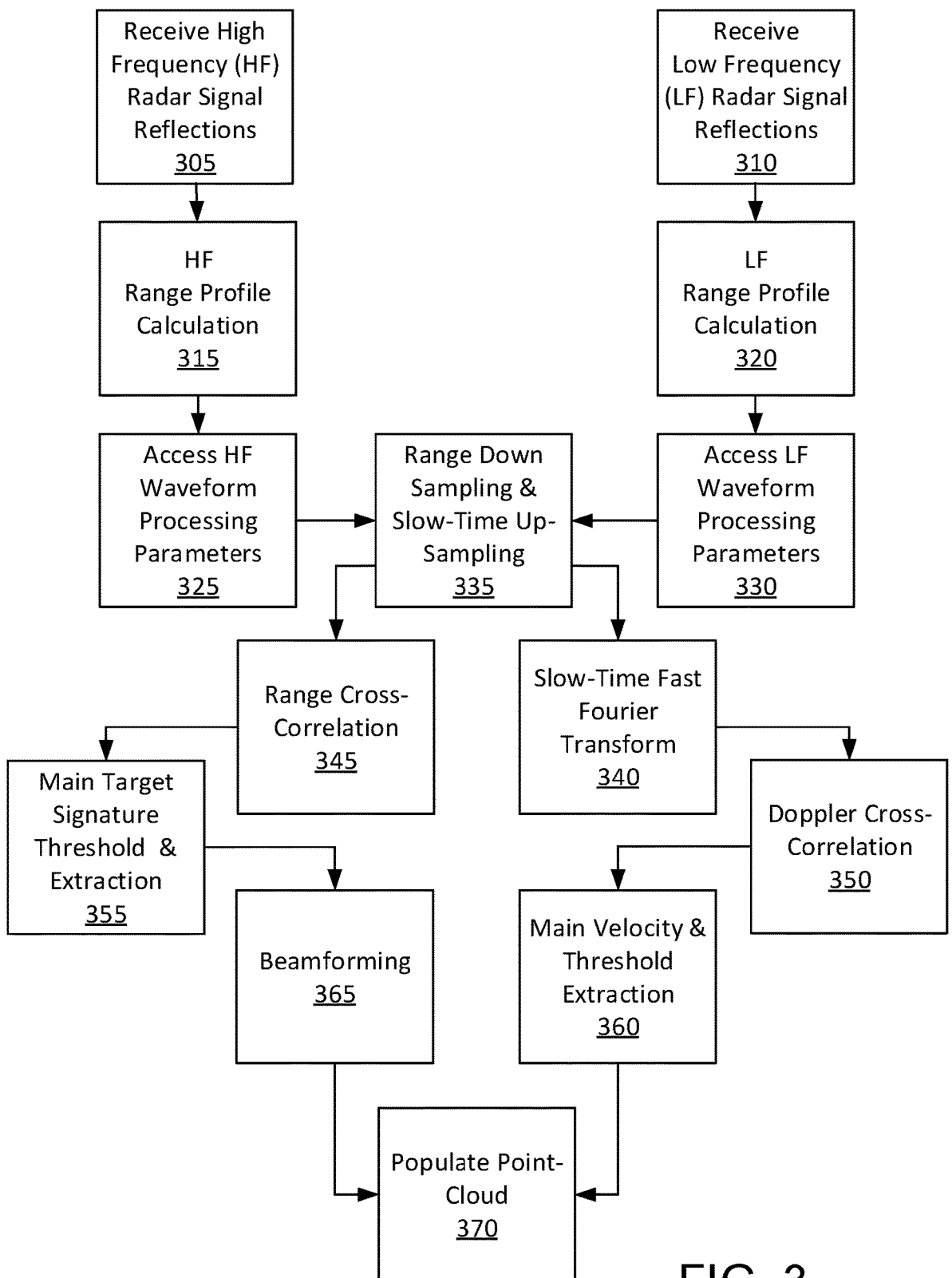
FIG. 3 illustrates a series of actions that may be performed when high frequency and low frequency radar signals are transmitted, received, and processed.

FIG. 3 illustrates a series of actions that may be performed when high frequency and low frequency radar signals are transmitted, received, and processed. The steps of FIG. 3 may be performed as two different processing threads that execute sequentially, in an interleaved fashion, or in parallel. Data collected or processed by operation of a set of program code associated with the transmission and receipt of high frequency radar signals may be made available for processing by a processor. This processor may execute instructions that are optimized for processing received low frequency radar signals or received high frequency radar signals. When different steps of FIG. 3 are performed in parallel, two different processors of a multiprocessor system may execute specific types of instructions and data generated by one processor may be shared with another processor that executes other sets of instructions.

Several of the steps of FIG. 3 may be associated with sets of high frequency radar signals, where other steps of FIG. 3 may be associated with sets of low frequency radar signals. FIG. 3 begins with step 305 where reflections of transmitted high frequency radar signals are received. Step 310 of FIG. 3 includes receiving reflections of transmitted low frequency radar signals. Steps 305, 315, and 325 may be associated with the processing of high frequency radar signals and steps 310, 320, and 330 may be associated with the processing of low frequency radar signals.

In step 315 of FIG. 3, calculations may be performed to identify a range profile to associate with the transmitted and received high frequency radar signals. This may include calculating distances from radar flight times. Different detections or radar data points may be associated with different ranges based on a length of time between transmission and reception of a radar signal. Similar calculations may be performed at step 320 when a range profile associated with the transmitted and received low frequency radar signals is identified. As discussed above, detection capabilities of different radar frequencies may vary based on different conditions or environmental factors.

Actions performed in step 325 of FIG. 3 may include accessing waveform processing parameters that can be used to perform a range downsampling function, where actions performed in step 330 of FIG. 3 may include accessing waveform processing parameters that can be used to perform an upsampling process along the antenna collection sweep direction (slow-time). Once these parameters have been accessed in step 325 and 330, they may be used by the processor when downsampling and upsampling functions are performed. These different functions may be performed sequentially, using interleaved computations, or in parallel by one or more processors executing instructions.

The range downsampling function of step 335 may delete points of data from a dataset or may select points of data from the dataset to keep. This may include applying a digital filter to remove components from the set of high frequency data. This digital filtering may be performed before the deletion or selection of data points is performed. The downsampling function may reduce the size of a dataset, reduce noise included the dataset, or reduce the effects of aliasing on data generated from the set of reflected high frequency radar signals received in step 305 of FIG. 3. The removal or selection of data points may be based the parameters accessed in step 325 of FIG. 3. A range downsampling function and related parameters may be associated with a maximum unambiguous range associated with a set of radar signals. Points of data that should be deleted from a dataset may be associated with a range that is greater than this maximum unambiguous range. Since radar signals may bounce off multiple object before being received back at a radar apparatus, such radar signals may be associated with a range that does not correspond to a real object being located within an effective rang of a radar apparatus. Information encoded in a radar signal may be used to identify a point in time when that radar signal was transmitted from a radar apparatus. A time associated with the receipt of a reflected radar signal may be used to identify a difference in time from which a distance may be calculated. These time differences may correspond to a distance to an object or may correspond to a time that a particular signal bounced off different objects before being received back at a radar apparatus.

Time differences that are greater than some threshold value may indicate that a particular radar signal did likely bounced off more than one object before being received by the radar apparatus. Such timing differences may be used to identify that a range associated with a detection that is farther away than the maximum unambiguous range of a radar apparatus. When such a determination is made, radar data associated with that detection may be removed from a dataset.

In instances when radar signals are received by a radar apparatus include an identifier identifying another radar apparatus, data associated with this other radar apparatus may be deleted from a dataset as part of a downsampling function.

This downsampling process may also include comparing data associated with the received high frequency signals and with the received low frequency signals to identify data that is consistent with both an object detected by an analysis of the received high frequency radar signals and an analysis of the received low frequency radar signals. For example, when an analysis shows that data associated with high frequency radar signals and low frequency radar signals are consistent with a car being located approximately 5 meters in front of a radar apparatus, both the high frequency radar data and the low frequency radar data may be considered to be consistent. Such consistent (i.e. matching) sets of radar data may be kept for further use, where any inconsistent data may be deleted from a dataset. Inconsistent data may be removed from the dataset based on an expectation that both high frequency and low frequency radar signals should be able to identify the presence of an object. Since inconsistent data may be caused by other reasons, such inconsistent data may not always be reason to remove particular data points from a dataset. As such, when one set of radar data indicates the presence of an object and another set of radar data does not indicate the presence of the object one or more different actions may be taken to resolve such a discrepancy.

In certain weather or environmental conditions (as discussed above), the presence of certain objects may be obscured from the view of an apparatus using high frequency radar signals where the presence of such an object may not be obscured from the view when a radar apparatus that uses low frequency radar signals. This may mean that data points collected using high frequency radar signals that have no corresponding low frequency data point may be more likely to be an erroneous data point than in circumstances where the opposite it true. Because of this, downsampling functions that remove data based on identifying an inconsistency of datapoints may only be used to remove data points associated with high frequency radar signals. Alternatively, a datapoint included in a low frequency dataset that have no corresponding high frequency datapoint may be retained based on an assumption that high frequency radar signals may have been blocked or absorbed.

How different sets of data are processed may be based on sets of parameters associated with the processing of waveform data. For the reasons above, a downsampling function may use data from step 315 where ranges of certain received radar signals may be identified and the range downsampling function performed in step 335 may remove data based on timing information associated with the high frequency waveform processing parameters accessed in step 325. In certain weather or environmental conditions, however, the presence of certain objects may be obscured from the view of an apparatus using high frequency radar signals where the presence of such an object may not be obscured from the view when the radar apparatus uses low frequency radar signals. Step 335 may also include performing a "slow-time" upsampling function. Such an upsampling function may evaluate received radar signal data (e.g. associated with the low frequency radar signals received in step 310) to generate interpolated radar data points located between data points that are really included in received radar signal data. This process may include using the low frequency range profile data identified in step 320 and the low frequency waveform processing parameters accessed in step 330 of FIG. 3. Interpolated data points may be identified based on an evaluation that plots a trajectory of the real data points included in the low frequency dataset. These interpolated datapoints may be placed in a dataset after applying the processing parameters accessed in step 330.

In an instance, when a high frequency radar signal dataset includes data at three times the resolution as data associated with a low frequency radar signal dataset, the high frequency dataset may include three times the number of data points than the low frequency dataset. Here the upsampling function may be used to add samples to the low frequency dataset. This upsampling may generate additional samples that may be used to compare data of the low and the high frequency datasets such that a comparison of the data sets may help remove data as discussed in respect to the downsampling above. Alternatively, or additionally the downsampling function may remove data from the high frequency dataset without initially adding the interpolated data to the low frequency dataset. As such, different downsampling functions may be performed using different processing parameters and types of analysis.

Step 345 of FIG. 3 may perform a range cross-correlation function. This may include performing evaluations on the datasets updated in step 335. This range cross-correlation eliminates the effect of the irradiated waveform and allows reflection data to be extracted from the updated data sets that in turn are used to identify objects that may be referred to as "main targets." Examples of such targets or objects may include yet are not limited to pedestrians, persons riding bicycles, vehicles, buildings, or sidewalks. Targets may be identified as specific types of objects in step 355 when data associated with the low and high frequency signals match criteria of an object to a threshold amount.

After step 355 a beamforming function may be performed in step 365. This beamforming may combine data received by different antenna receiving elements in a way that compensates for differences in particular received radar signals being received by different antenna elements at slightly different points in time. For example, a first radar element may transmit a radar signal that bounces off a vehicle and then the reflected radar signal may be received by the first radar element, a second radar element, and a third radar element at different times. Since, each of these different elements received the reflected radar signal at different times (for example, based on a spatial distance between the respective radar elements), step 365 may associate these different detections with a same object at a same point in time, instead of being associated with one or more objects and/or the different times.

FIG. 3 also shows that steps 340, 350, and 360 occur after step 335. Note that the various steps that occur after step 335 may be performed by one or more processors that perform evaluations sequentially, using interleaved computations, or in parallel. A fast Fourier transform (FFT) may be performed on the datasets updated in step 335. This FFT may convert data in the frequency domain into data in the time domain. Next in step 350, a Doppler cross-correlation function needs be performed. This may include evaluating reflected radar data from different sets of radar transmissions to identify relative motion of objects and a radar apparatus. Next in step 360, velocities of main targets/objects may be identified and extracted from the processed data. Step 360 may only extract velocity data that meets a particular threshold.

Data from the beamforming step 365 and the velocity detection and extraction step 360 may be included in or added to a set of point-cloud data in step 370 of FIG. 3. Data included in a point cloud may include data from multiple time steps and radar antennas or apparatuses. This point cloud data may identify places around a sensing apparatus from which radar reflections were received. Locations of data points of combined data may be identified and used to extract per-point features from external sources (for example, a-priori semantic maps containing road surface type labels).

Point cloud data may be organized in a way that is amenable to application of a machine learned algorithm. For example, the data may be organized into a matrix where rows of the matrix may correspond to respective data points and columns of the matrix correspond to raw radar features (like approximate RCS or range rate) for each data point. This feature data may include hand engineered features, radar domain-knowledge features, or a combination of both. For a given detected point, point cloud data may include radiometric features like radar cross section as well as doppler features such as an ambiguous range rate or velocity. The data included in this matrix may be data from point clouds of multiple physical radars and multiple temporal frames that have been aggregated and projected into a feature space using domain-specific preprocessing and feature extraction. This point cloud data may include data associated with target or object data extracted in step 355 or the velocities identified in step 360.

Once the data has been populated in the point cloud in step 370, that data may be provided to other sub-systems or be accessed by other processes of a radar apparatus when other functions of the radar apparatus are performed. For example, the data may be provided to a process that makes perceptions about objects associated with the point cloud data. The point cloud data may be used to identify movement vectors or to identify whether an object is a risk of being impacted by an autonomous vehicle (AV) where the radar apparatus resides.

Figure 4:
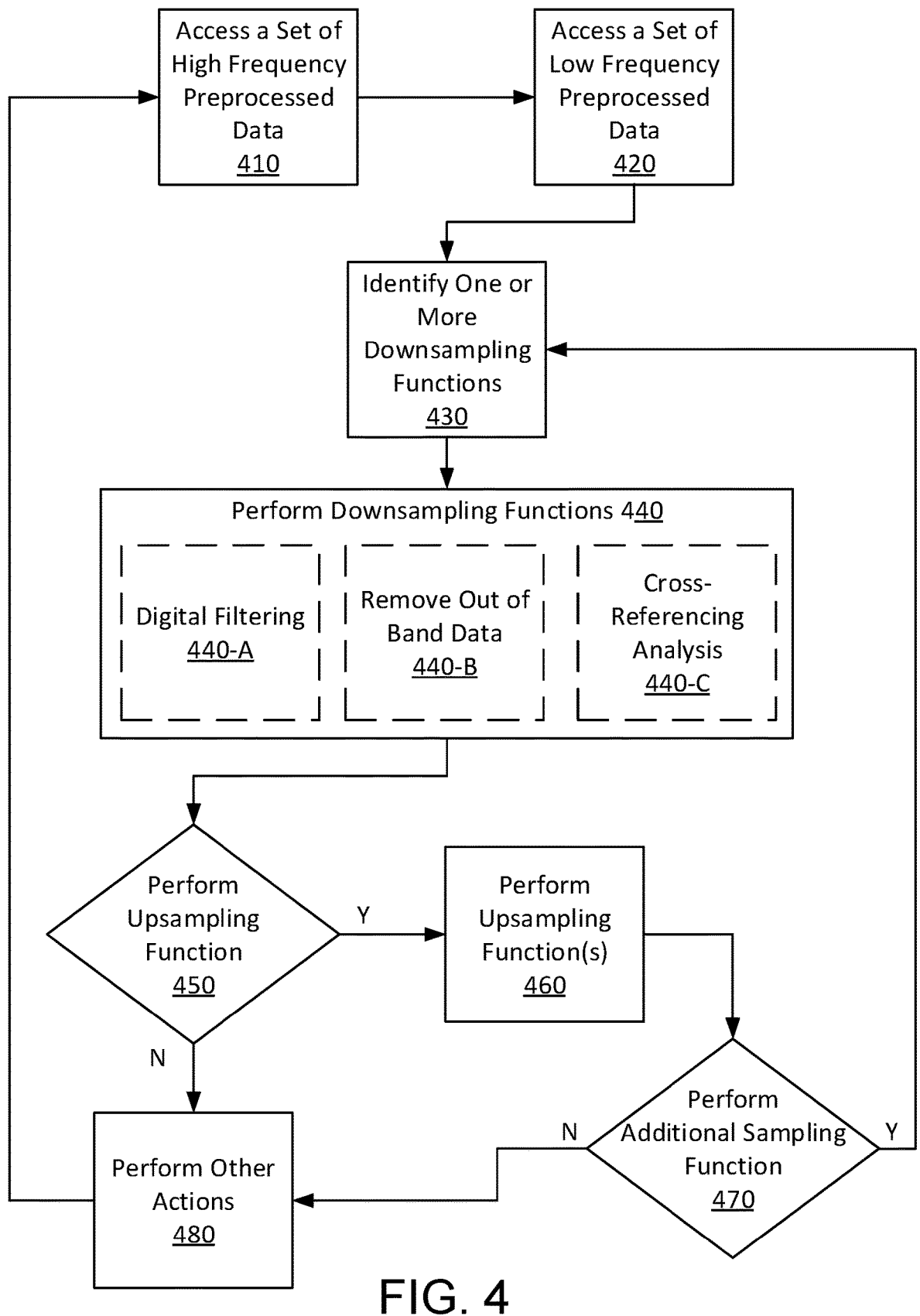
FIG. 4 illustrates a series of steps that may be performed when certain data is excluded from a first updated dataset and when other data is added to a second updated dataset.

FIG. 4 illustrates a series of steps that may be performed when certain data is excluded from a first updated dataset and when other data is added to a second updated dataset. The steps of FIG. 4 may be performed after sets or reflected radar signals have been received at a radar apparatus and may be performed after these received radar signals have been preprocessed by a processor that executes instructions out of a memory. After raw radar signals have been received, a preprocessing function may be performed. This preprocessing may identify points in an area around an autonomous vehicle (AV) that are associated with reflected radar signal energy. This preprocessing may also identify times at which particular points of reflected radar energy were received. Preprocessed sets of radar data may associate locations where potential objects may be located and this location data may be cross-referenced with temporal information from which other processing may be performed or from which spatial mappings may be generated.

FIG. 4 begins with step 410 where a set of preprocessed high frequency radar data is accessed. Step 420 is where a set of preprocessed low frequency radar data is accessed. As mentioned above, this preprocessed radar data may have been generated after one or more sets of radar signals have been received at a radar apparatus. Such preprocessed sets of radar data may be stored in two different data sets, one associated with the received high frequency radar signals and another associated with the received low frequency radar signals. Alternatively, this preprocessed data may be stored as a single set of data where particular data points may be cross-referenced with identifiers that identify data points that are associated with the reflected high frequency radar signals and other data points that are associated with the reflected low frequency signals.

Next in step 430, one or more downsampling functions may be prepared to be implemented. This may include accessing the high frequency waveform processing parameters discussed in respect to step 325 of FIG. 3. These processing parameters may identify which of a set of downsizing functions should be performed or that should be performed at a particular time or order. Step 440 of FIG. 4 also shows several exemplary downsizing functions that could be performed, these include a digital filtering function 440-A, a removing out of band data function 440-B, and/or a cross-referencing data analysis function 440-C. Digital filtering function 430-A may reduce noise or aliasing of acquired data, for example, by implementing a low pass filter that removes data that apparently has a frequency lower than a Nyquist frequency.

The removing out of band data function 430-B may identify information that is associated with a time that exceeds a time maximum associated with an unambiguous range as discussed above. Here again, since radar signals may bounce off multiple objects before being received back at a radar apparatus, such radar signals may be associated with a range that does not correspond to a real object range. Out of band data may also be data associated with radar signals the belong to another radar apparatus. Such out of band signals may be removed from a dataset when downsampling function 440-B is performed.

The cross-reference analysis function 440-C may compare data included in the high frequency preprocessed data set with data included in the low frequency preprocessed data set. In certain instances, data from the high frequency preprocessed data may be removed when data from the low frequency data does not include information that is compatible or that matches certain information in the high frequency data for the reasons discussed in respect to FIG. 3.

Next program flow may move to determination step 440, that may identify whether an upsampling process should be performed, when no, program flow may move to step 480 where other functions may be performed. When determination step 450 identifies that the upsampling process should be performed, program flow may move to step 460 where the upsampling function is performed. This upsampling function may include identifying where data points could be added to a dataset and these data points could be added to the dataset using interpolation as discussed above.

Next, determination step 470 may identify whether an additional sampling function should be performed. An additional sampling function may be performed after data points have been added to a dataset as part of an upsampling function. These added data points may make the cross-referencing analysis function 440-C more effective or reliable. When determination step 470 identifies that an additional sampling function should be performed, program flow may move back to step 430 where once again downsampling functions that should be performed may be identified. In such an instance, the cross-referencing analysis function 440-C may be performed when the low frequency dataset includes interpolated datapoints. The interpolated datapoints may allow a processor to identify that high frequency certain data points should not be removed from a dataset when the interpolated data points match data points associated with high frequency radar signals.

When determination step 470 identifies that an additional sampling function should not be performed, program flow may move to step 480 where additional actions may be performed. After step 480, program flow may move back to step 410 where steps of FIG. 4 may be repeated.

Figure 5:
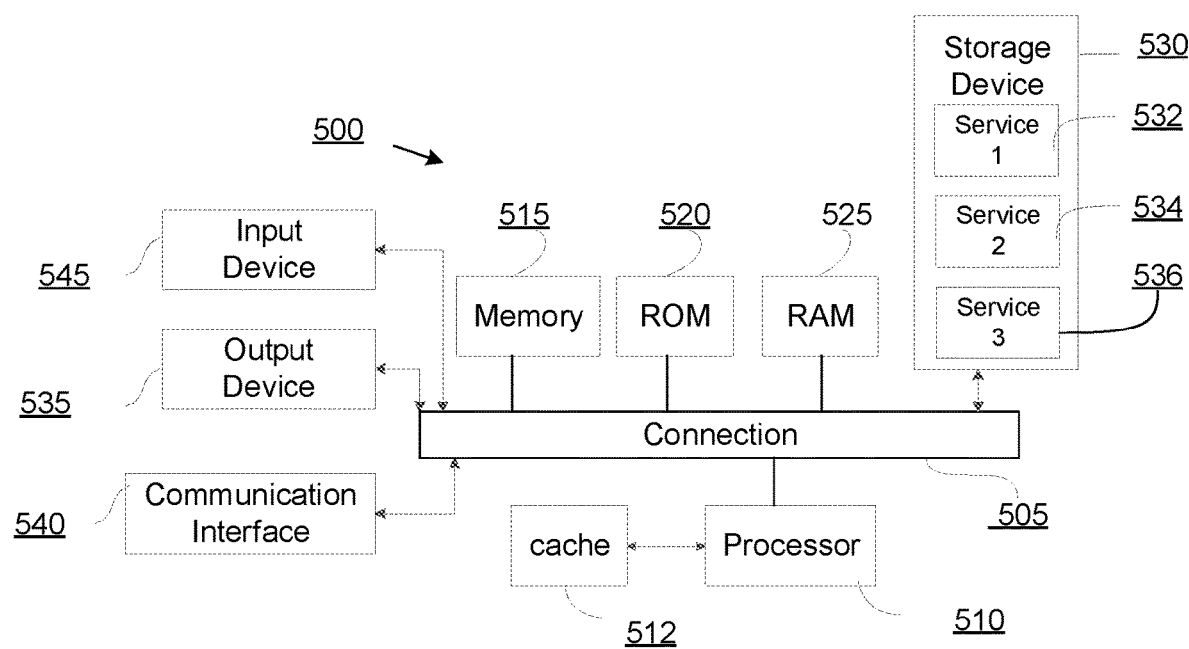
FIG. 5 shows an example of a computing system that may be used to implement at least some of the functions reviewed in the present disclosure in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for processing radar data, the method comprising:
performing a downsampling function on a first set of preprocessed radar data when generating a first updated dataset, the first set of preprocessed radar data generated from a first set of received radar signals of a first frequency, wherein the first updated data set includes less data than the first set of preprocessed data based on the performance of the downsampling function;
performing an upsampling function on a second set of preprocessed radar data when generating a second updated dataset, the second set of preprocessed radar data generated from a second set of received radar signals of a second frequency, wherein:
the second updated dataset includes more data than the second set of preprocessed data based on the performance of the upsampling function, and
the first frequency of the first set of radar signals is greater than the second frequency of the second set of radar signals;
performing a range cross-correlation function on the first updated dataset;
generating target signatures and ranges to associate with one or more objects based on the performance of the range cross-correlation function;
performing a Doppler cross-correlation function on the second updated dataset; and
generating velocity data to associate with the target signatures and the ranges associated with the one or more objects based on the performance of the Doppler cross-correlation function.

2. The method of claim 1, further comprising:
transmitting a first set of radar signals of the first frequency;
receiving the first set of radar signals after the first set of transmitted radar signals are reflected off of at least one object of the one or more objects;
transmitting a second set of radar signals of the second frequency; and
receiving the second set of radar signals after the second set of transmitted radar signals are reflected off of at the least one object of the one or more objects.

3. The method of claim 1, further comprising:
accessing a set of high frequency waveform processing parameters; and
accessing a set of low frequency waveform processing parameters.

4. The method of claim 1, wherein the performance of the range downsampling function includes applying a digital filter to the updated first dataset.

5. The method of claim 1, wherein the performance of the range downsampling function includes not including datapoints in the first updated dataset that are associated with a range that is greater than a maximum range.

6. The method of claim 1, wherein the performance of the range downsampling function includes:
performing an analysis that compares information associated with the first set of preprocessed data with information associated with the second set of preprocessed data;

identifying that a characteristic associated with the first set of preprocessed data matches a characteristic associated with the second set of preprocessed data; and keeping data associated with the match based on the identification that the characteristic associated with the first set of preprocessed data matches the characteristic associated with the second set of preprocessed data.

7. The method of claim 3, wherein the performance of the range downsampling function includes:

performing an analysis that compares information associated with the first set of preprocessed data with information associated with the second set of preprocessed data;

identifying that data included in at least one of the first set preprocessed data is not consistent with data included in the second set of preprocessed data; and removing at least one data point from the first set of preprocessed data based on the inconsistency.

8. The computing system of claim 1, wherein the instructions are effective to further cause the computing system to:

transmit a first set of radar signals of the first frequency;

receive the first set of radar signals after the first set of transmitted radar signals are reflected off of at least one object of the one or more objects;

transmit a second set of radar signals of the second frequency; and receive the second set of radar signals after the second set of transmitted radar signals are reflected off of at the least one object of the one or more objects.

9. The computing system of claim 1, wherein the instructions are effective to further cause the computing system to:

access a set of high frequency waveform processing parameters; and access a set of low frequency waveform processing parameters.

10. The computing system of claim 1, wherein the performance of the range downsampling function includes applying a digital filter to the updated first dataset.

11. The computing system of claim 1, wherein the performance of the range downsampling function includes not including datapoints in the first updated dataset that are associated with a range that is greater than a maximum range.

12. The computing system of claim 1, wherein the performance of the range downsampling function includes:

performing an analysis that compares information associated with the first set of preprocessed data with information associated with the second set of preprocessed data;

identifying that a characteristic associated with the first set of preprocessed data matches a characteristic associated with the second set of preprocessed data; and keeping data associated with the match based on the identification that the characteristic associated with the first set of preprocessed data matches the characteristic associated with the second set of preprocessed data.

13. The computing system of claim 9, wherein the performance of the range downsampling function includes:

performing an analysis that compares information associated with the first set of preprocessed data with information associated with the second set of preprocessed data;

identifying that data included in at least one of the first set preprocessed data is not consistent with data included in the second set of preprocessed data; and removing at least one data point from the first set of preprocessed data based on the inconsistency.

14. A computing system for processing radar data, the system comprising:

at least one non-transitory computer readable medium comprising instructions stored thereon, wherein the instructions are effective to cause the computing system to:

perform a downsampling function on a first set of preprocessed radar data when generating a first updated dataset, the first set of preprocessed radar data generated from a first set of received radar signals of a first frequency, wherein the first updated data set includes less data than the first set of preprocessed data based on the performance of the downsampling function;

perform an upsampling function on a second set of preprocessed radar data when generating a second updated dataset, the second set of preprocessed radar data generated from a second set of received radar signals of a second frequency, wherein:

the second updated dataset includes more data than the second set of preprocessed data based on the performance of the upsampling function, and the first frequency of the first set of radar signals is greater than the second frequency of the second set of radar signals;

perform a range cross-correlation function on the first updated dataset;

generate target signatures and ranges to associate with one or more objects based on the performance of the range cross-correlation function;

perform a Doppler cross-correlation function on the second updated dataset; and generate velocity data to associate with the target signatures and the ranges associated with the one or more objects based on the performance of the Doppler cross-correlation function.

15. A non-transitory computer readable medium comprising instructions stored thereon, wherein the instructions are effective to cause the computing system to:

perform a downsampling function on a first set of preprocessed radar data when generating a first updated dataset, the first set of preprocessed radar data generated from a first set of received radar signals of a first frequency, wherein the first updated data set includes less data than the first set of preprocessed data based on the performance of the downsampling function;

perform an upsampling function on a second set of preprocessed radar data when generating a second updated dataset, the second set of preprocessed radar data generated from a second set of received radar signals of a second frequency, wherein:

the second updated dataset includes more data than the second set of preprocessed data based on the performance of the upsampling function, and the first frequency of the first set of radar signals is greater than the second frequency of the second set of radar signals;

perform a range cross-correlation function on the first updated dataset;

generate target signatures and ranges to associate with one or more objects based on the performance of the range cross-correlation function;

perform a Doppler cross-correlation function on the second updated dataset; and generate velocity data to associate with the target signatures and the ranges associated with the one or more objects based on the performance of the Doppler cross-correlation function.

16. The non-transitory computer-readable medium of claim 15, wherein the instructions are effective to further cause the computing system to:
- transmit a first set of radar signals of the first frequency;
- receive the first set of radar signals after the first set of transmitted radar signals are reflected off of at least one object of the one or more objects;
- transmit a second set of radar signals of the second frequency; and
- receive the second set of radar signals after the second set of transmitted radar signals are reflected off of at the least one object of the one or more objects.

17. The non-transitory computer-readable medium of claim 15, wherein the instructions are effective to further cause the computing system to:
- access a set of high frequency waveform processing parameters; and
- access a set of low frequency waveform processing parameters.

18. The non-transitory computer-readable medium of claim 15, wherein the performance of the range downsampling function includes applying a digital filter to the updated first dataset.

19. The non-transitory computer-readable medium of claim 15, wherein the performance of the range downsampling function includes not including datapoints in the first updated dataset that are associated with a range that is greater than a maximum range.

20. The non-transitory computer-readable medium of claim 15, wherein the performance of the range downsampling function includes:
- performing an analysis that compares information associated with the first set of preprocessed data with information associated with the second set of preprocessed data;
- identifying that a characteristic associated with the first set of preprocessed data matches a characteristic associated with the second set of preprocessed data; and
- keeping data associated with the match based on the identification that the characteristic associated with the first set of preprocessed data matches the characteristic associated with the second set of preprocessed data.

* * * * *